United States Patent [19]

Shaneyfelt

[11] Patent Number: 5,288,324
[45] Date of Patent: Feb. 22, 1994

[54] MULTI-COLOR POWDER COAT PAINT RECOVERY APPARATUS

[76] Inventor: Jack L. Shaneyfelt, R.R. 2, Box 2052, Country Club Rd., Baimbridge, Ga. 31717

[21] Appl. No.: 992,563

[22] Filed: Dec. 18, 1992

[51] Int. Cl.$^5$ .............................................. B05B 15/04
[52] U.S. Cl. ................................. 118/326; 118/501; 118/621; 118/629; 118/634
[58] Field of Search ............... 118/323, 326, 309, 501, 118/621, 624, 626, 629, 630, 634, 310, 312, 314

[56] References Cited

U.S. PATENT DOCUMENTS 3,913,523  10/1975  Probst et al. .................... 118/630 X
4,386,578   6/1983  Haslund ............................ 118/669

Primary Examiner—David A. Simmons
Assistant Examiner—James J. Engel, Jr.
Attorney, Agent, or Firm—Waters & Morse

[57] ABSTRACT

A multi-color powder coat paint recovery apparatus that permits rapid color changes in a powder coat operation comprises a rotatable paint booth positioned adjacent to a painting station, with the booth having a plurality of individual paint color chambers angularly spaced around the periphery of the booth. Each chamber has an open outer side and a filter mechanism at an inner side, with the inner side being in communication with an exhaust outlet from the interior of the housing. The chamber further has primary and secondary paint hoppers positioned below each filter mechanism. An air circulating mechanism draws air inwardly from the painting station through the open outer side of the chamber, through the filter mechanism, out of the housing through the air outlet, and then returns the air through a filtered outlet in a plenum chamber behind the paint applicator. Each color chamber corresponds to a separate paint color. Colors can be changed by rotating the booth until the chamber for the desired color is positioned opposite the painting station. Excess paint is drawn downwardly into the paint hopper for each color and is recycled by a vacuum that conveys the paint back to a recycling apparatus for reuse in the system. The parts are painted while they are hot so as to increase paint retention on the parts.

6 Claims, 11 Drawing Sheets

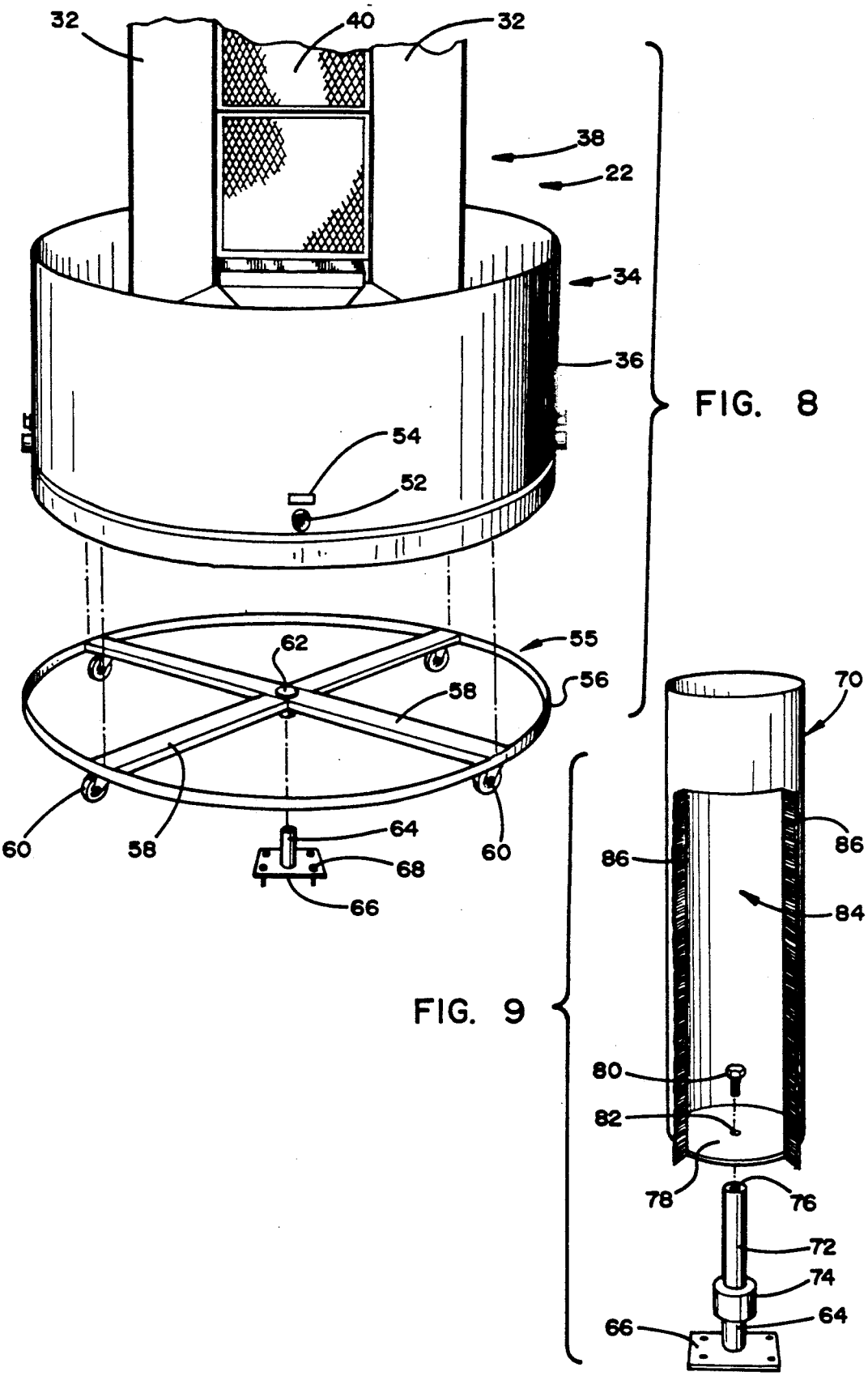

MULTI-COLOR POWDER COAT PAINT RECOVERY APPARATUS

BACKGROUND OF THE INVENTION

The present invention relates to powder coat paint recovery apparatus wherein color changes can be made quickly, paint is recovered effectively for reuse, and air is recirculated to create a desirable air flow.

In a powder coat paint operation, charged particles of solid paint are deposited on an oppositely charged product to be painted and the product is heated to fuse the paint to the product surface. This operation is well known and provides a high quality paint finish to a product without the use of volatile solvents.

While the finish on a powder coated product is desirable, the painting operation used in the application of powder coat paints has some drawbacks. The paint particles not deposited and retained on the product are difficult to control and recover, with the particles tending to settle on and coat the objects and equipment in the paint booth. The particulate matter suspended in the air also causes a health hazard to paint booth operators. There is also a substantial amount of paint loss with powder coated painting operations.

Because of the difficulty in controlling powder coat paint, it is very difficult to change colors in a powder coat painting operation. Usually it is necessary to clean all of the equipment and all of the hoses very thoroughly before colors can be changed. This can take hours. In a high speed operation wherein products are painted with a number of different colors, this drawback precludes the use of powder coat paints, notwithstanding their benefits.

An object of the present invention is to provide multi-color powder coat painting apparatus that permits quick color changes and provides for a high rate of paint recovery for recycling, while at the same time providing highly filtered air and a positive air flow across the parts being painted.

SUMMARY OF THE INVENTION

The present invention comprises a multi-color powder coat paint recovery apparatus for recovering excess powder paint particles not deposited on an article being painted by a paint applicator at a painting station. The present invention comprises a paint recovery booth positioned adjacent to the painting station on a side opposite the paint applicator, the paint recovery booth comprising a housing mounted for rotation about a vertical axis and having a plurality of individual paint color chambers angularly spaced around the periphery of the housing. Each chamber has an open outer side and a filter mechanism at an inner side, with the inner side being in communication with an exhaust outlet from the interior of the housing. The chamber further has a primary paint hopper positioned below each filter mechanism, which extends outwardly to the outer side of the chamber. An air circulating mechanism is connected to the air outlet for drawing air inwardly through the open outer side of the chamber, through the filter mechanism, and then out of the housing through the air outlet. The housing is rotatable such that a color chamber corresponding to the paint color being applied at the painting station can be rotated to a position opposite the painting station. The air circulation means creates an air flow from the paint applicator over the part being painted and through the open side of the chamber opposite the paint station, over the paint hopper, through the filter mechanism and then out the outlet. Excess paint particles entrained in the air fall toward the hopper under the influence of gravity as the air is drawn toward the filter mechanism. Some particles fall into the hopper before they reach the filter mechanism, while other particles are separated from the air by the filter mechanism. Clean air is discharge from the outlet. Particles discharged from the filter mechanism periodically fall downwardly into the paint hopper.

Air discharged from the outlet of the paint recovery booth is conveyed in a duct to a return air plenum chamber positioned behind the paint station. The air passes through a filter and flow control diffuser in the face of the plenum chamber, and is then released to the room in a direction toward the paint applicator and the paint recovery booth, creating an air recirculation pattern that provides an air flow in the room in the direction toward the paint recovery booth.

The present invention also provides for the automatic recycling of powdered paint from the paint booth for reuse by the applicator. Powdered paint is drawn by a vacuum through an outlet in a lower portion of the paint hopper to a separate paint recovery apparatus for each color paint. The paint recovery apparatus removes the powdered paint from the air and deposits the paint in a storage bin for reuse. The air is then directed to the plenum chamber for the recirculation air and is reintroduced into the room along with the air from the paint recover booth after being filtered in the plenum chamber.

The paint recovery booth of the present invention also has a smaller secondary paint hopper adjacent the front lower edge of the filter in each chamber, such that the recirculation of powdered paint back to the operator for reuse causes a downward air flow across the filter. This air flow draws paint particles downwardly to the paint hopper before they can reach the filter, thus minimizing the amount of paint build-up on the filter surface.

The apparatus also includes automatic filter shaking devices for periodically dislodging paint particles from the filter surface.

With the present invention, a color can be selected simply by rotating the paint booth to the desired color chamber and connecting separate hoses for each of the chambers to the application equipment. To change a color, the bin is rotated to a new color and the bin and paint application equipment is connected to the appropriate hosing for the new color. This takes a matter of minutes and does not require the elaborate cleaning that has heretofore been a feature of a powder coat painting operation.

In the painting process of the present invention, the parts are heated to 120° F. to 150° F. or preferably 120° F. to 140° F. before paint application. This improves paint adherence to the part, especially the small paint particles or fines.

These and other features of the present invention are described in more detail in connection with a description of the preferred embodiment.

BRIEF DESCRIPTION OF THE DRAWINGS

FIG. 8 is an exploded view showing the manner in which the paint recovery booth is rotatably mounted on a floor surface.

FIG. 9 is an exploded view of the central air duct of the present invention.

DETAILED DESCRIPTION OF PREFERRED EMBODIMENTS

Figure 1:
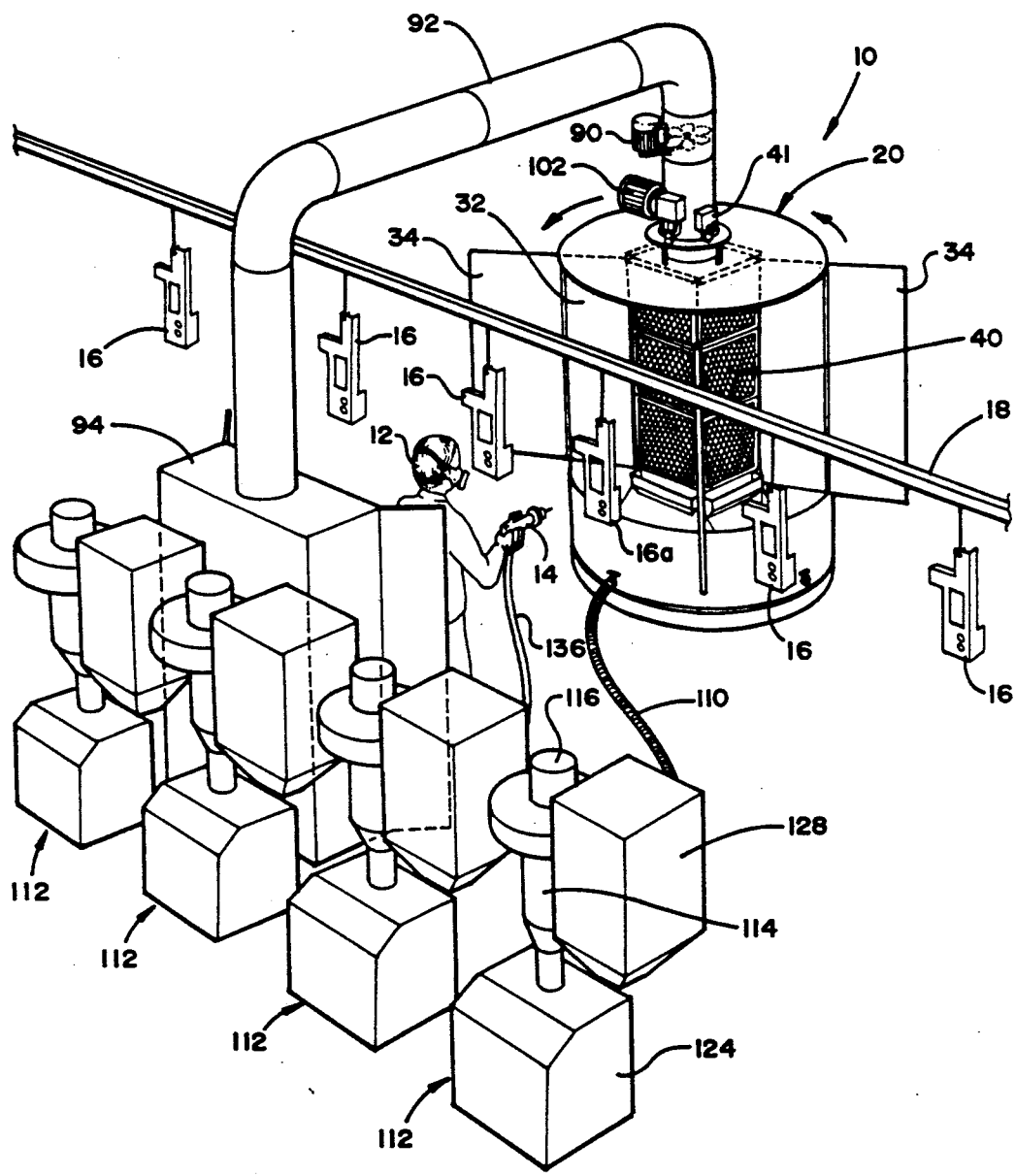
FIG. 1 is a perspective view of the paint recovery apparatus of the present invention.

Referring to the drawings, paint recovery apparatus 10 constructed in accordance with the present invention is used in a powder coat paint operation where an operator 12 applies paint with a paint gun 14 to parts 16 carried by a conveyor 18 as they reach a painting station indicated by the position of part 16a.

Paint recovery apparatus 10 includes a multi-color paint booth 20 positioned adjacent the painting station of part 16a on the opposite side of the part from operator 12. Paint recovery apparatus 20 recovers and collects powdered paint that is not deposited on the parts being painted. This includes paint particles that are too small to hold a charge and therefore do not adhere to the part, as well as paint particles that miss the part or constitute excess paint. In a powder coat operation there is a considerable amount of excess paint as well as paint particles that are too small to adhere to the part (generally called "fines").

Figure 2:
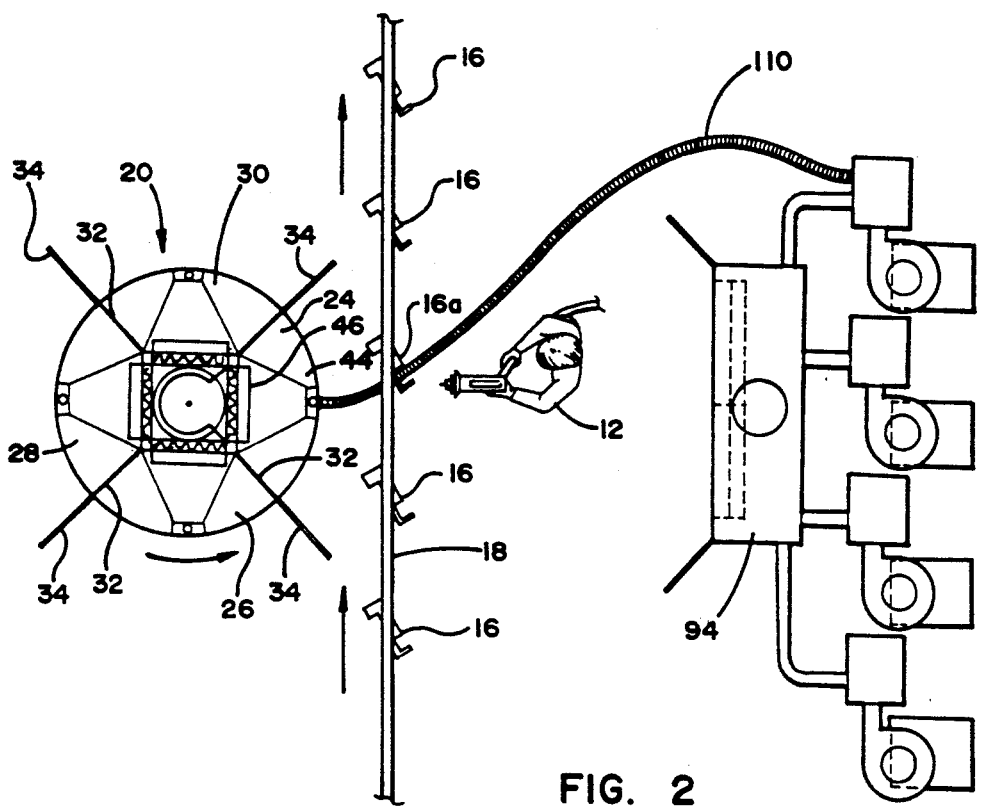
FIG. 2 is a plan view of the paint recovery apparatus of FIG. 1.
Figure 3:
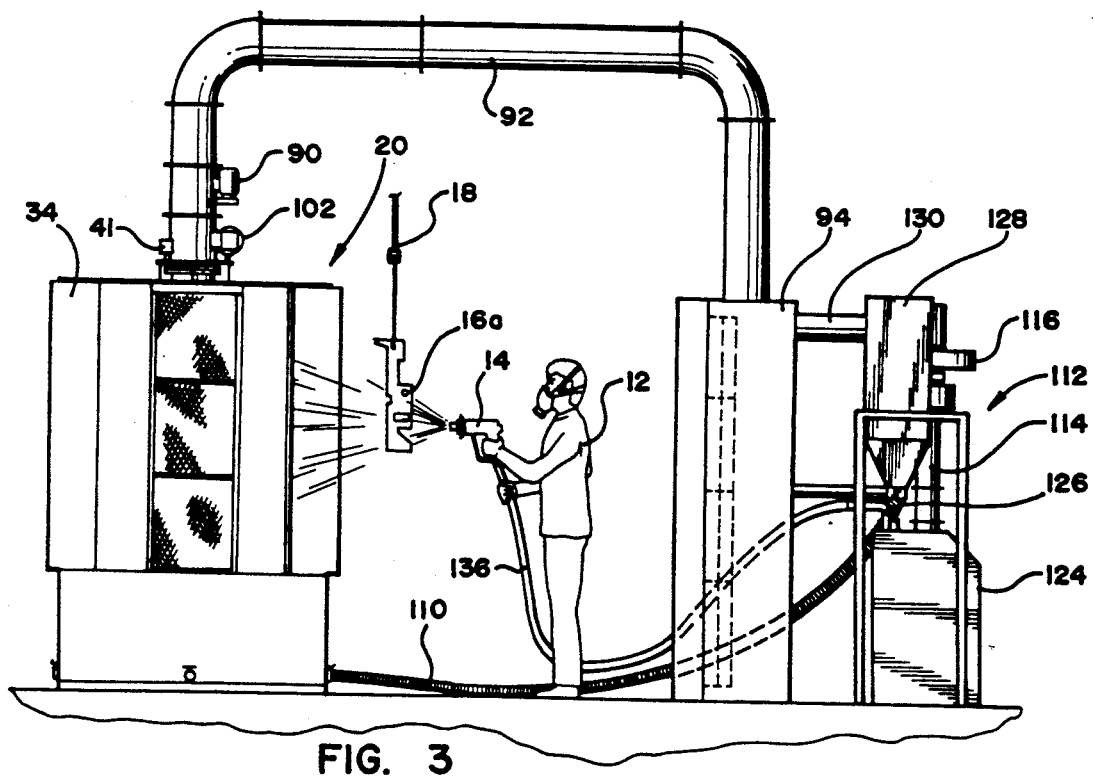
FIG. 3 is a side elevational view of the paint recovery apparatus of the present invention.
Figure 18:
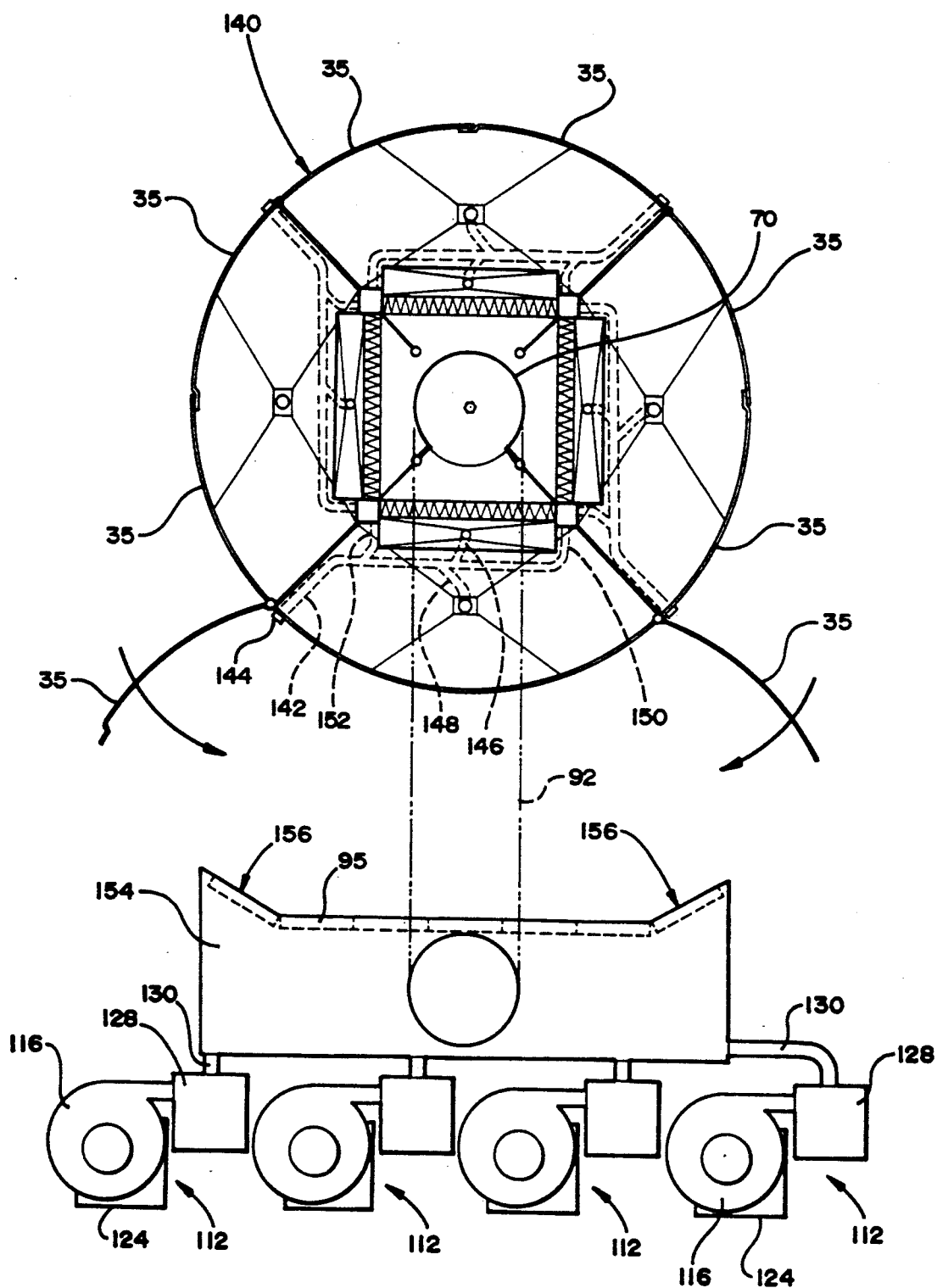
FIG. 18 is a plan view of the present invention showing an enlarged return air plenum chamber used with a larger paint booth, and showing an alternative side outlet exhaust pipe from the primary and secondary paint hoppers.

Referring to FIG. 2, paint recovery booth 20 comprises a housing 22 that is mounted on the floor for rotation about a central vertical axis. The housing in the preferred embodiment is divided into four angularly spaced paint chambers 24, 26, 28, and 30, with each chamber occupying a 90 degree section of the cylindrical housing and with the various chambers being separated by baffles or partitions 32. Baffles 34 extend outwardly from the housing at the ends of the baffles 32. These can be the fixed baffles 34 shown in FIG. 1 or they preferably can be closeable curved doors 35 as shown in FIG. 18. The doors are pivotally mounted along the side edges of each chamber and are closed over all of the chambers except the one being used, thus forming a cover over the chambers not in use and further restricting contamination of the colors. Each of the paint chambers 24, 26, 28, and 30, is dedicated to a single color, so that four separate colors can be applied to articles at the painting station depending upon which paint chamber is rotated to face the painting station. The housing is not limited to four painting chambers but could include fewer or more chambers, as desired.

The construction of paint recovery booth 20 is shown in greater detail in FIGS. 5-10. Housing 22 comprises a lower portion 34 enclosed by a cylindrical skirt 36 and an upper portion 38 the outer side of which is open. Upper portion 38 includes baffles 32 tapering inwardly to an open rear side that is covered by filter elements 40 at the inner side of each paint chamber. Separate filter elements are mounted in a grid frame in the open rear side. The housing has an open central portion 42 positioned behind the filter elements 40 and in communication with the paint chambers through the filters. The lower portion of the housing includes a pair of paint hoppers, a primary hopper 44 that in essence covers the entire area of each paint chamber from the inside to the outside periphery of the paint recovery booth, and a secondary hopper 46 that is smaller and covers the area immediately in front of and below the filters on each paint chamber. The primary and secondary hoppers are connected by outlet conduits 48 and 50 leading to outlet 52. A gate valve 54 in conduit 48 is manually actuatable to open and close the outlet of the primary filter.

Housing 22 is mounted on a cylindrical wheeled frame 55 (FIG. 8) comprising an annular rim 56, radial spokes 58, and wheels 60, which are mounted on the spokes at the rim. A central axial opening 62 in the frame fits over a vertical rod 64 that is mounted on a flat plate 66, which is attached to the floor by bolts 68 or the like through openings in the plate. The rim thus can rotate around rod 64 but is held in a fixed axial position on the floor. The lower portion 36 of the housing is mounted on the rotating frame and is thus capable of being rotated to position any one of the four paint chambers opposite the painting station.

Referring to FIG. 9, a cylindrical air outlet duct 70 is mounted in a fixed position in the opening 42 in the center of the housing. An extension rod 72 is mounted on rod 64 (which is attached to the floor by plate 66) by means of a collar 74. The upper end of rod 72 has a threaded opening 76 therein so that the rod can be attached to a bottom plate 78 of the air outlet duct by means of a bolt 80 that fits through an opening 82 in plate 78. In this manner, air outlet duct is bolted in a fixed position to the floor and supported by rods 72 and 64. Air outlet duct 70 has an open side 84 that extends through an angular degree of 90 degrees and is of a height equal to the height of the filters 40. The vertical edges of opening 84 have mounted thereon a row of dense bristle brushes 86.

Figure 10:
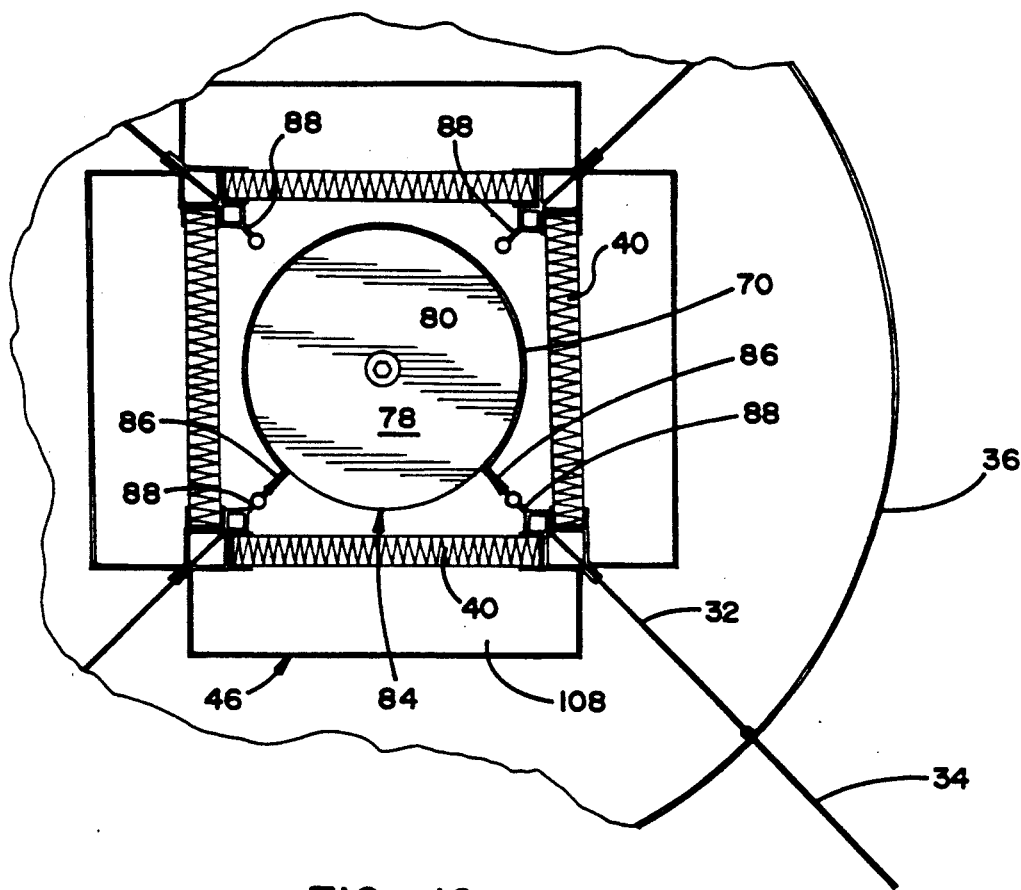
FIG. 10 is a partial sectional view of the paint recovery booth taken along lines 10—10 of FIG. 4.

As shown on FIG. 10, brushes 86 abut inwardly extending flange extensions 88 from each of the paint chambers as they are rotated into position adjacent the painting station. The brushes provide a resilient powder barrier seal between the interior of the air outlet duct and the single paint chamber facing the painting station.

With the housing and air outlet duct of the present invention, the open side of the air outlet duct always faces the painting station, while the housing rotates around the air outlet duct to position a desired color chamber opposite the painting station. The interior of the air outlet duct is therefore in communication only with the painting chamber opposite the painting station and the rest of the painting chambers are isolated.

As shown in FIG. 2, the upper end of the air outlet duct 70 is connected through an outlet fan 90 to an air recirculation duct 92 that extends over the work area and downward to a return air plenum chamber 94 and is positioned behind the operator. The plenum chamber is a rectangular housing having an open front portion facing the rear of the paint operator, with the opening being provided with a grid work frame for supporting a plurality of filters 95 in the openings. The frame 93 also supports a diffuser mechanism 97 consisting of a pair of adjustable perforated diffuser plates 96 and 98 with aligned openings 103 therein. The plates are bolted together by bolt 99 through a slotted opening 101 in plate 96. The position of plate 96 can be adjusted to change the overlap of the openings. This serves to control the rate of air flow through the front face of the plenum chamber housing (see FIGS. 12-15). Baffles 100 extend forwardly at an angle from the front of the plenum chamber housing to direct air flow toward the back of the operator.

With this apparatus, fan 90 causes a controlled air flow from the operator across the work piece 16a in the painting station toward the paint recovery booth. The air flow entrains paint particles and directs them to the paint recovery booth, where they are deposited in the primary or secondary hoppers or are deposited on filters 40. The air then passes through the air outlet duct and the air recirculation duct and is reintroduced into the room behind the operator in the same direction of air flow toward the paint recovery booth. The air has been filtered twice in this process and is completely free from paint particles, and all paint particles in the air have been drawn away from the operator and carried toward the paint recovery booth.

When it is desired to rotate the paint recovery booth for purposes of changing paint colors, a motor 102 mounted at the upper end of air outlet duct 70 and connected to air recirculation duct 92 drives a fly wheel attached to the rotatable paint recovery booth and causes the paint recovery booth to rotate to the desired paint chamber.

The powder coat overspray paint is recovered in the primary and secondary paint recovery hoppers that are positioned in the lower portion of the recovery booth housing. These hoppers are shown in more detail in FIGS. 5, 6 and 7. Primary hopper 44 extends all the way from the base of filters 40 to the outer periphery of the paint recovery booth housing to the outer wall 36. The primary booth has a downwardly and outwardly tapered bottom 104 and downwardly and inwardly tapered side walls 105 that guide paint particles deposited in the hopper downwardly toward outlet conduit 48. Manual gate valve 54 can be opened to permit the paint powder in the primary hopper to be deposited in conduit 50 leading to outlet 52. This is done periodically to recycle the paint in the primary hopper.

The secondary hopper 46 also includes downwardly and inwardly extending bottom walls 106 leading to outlet conduit 50 at the bottom of the hopper. The secondary hopper provides a relatively narrow rectangular open upper end 108 that extends outwardly from the underside of filters 40 only a short distance, preferably about three inches outwardly from the face of the filter. The secondary hopper opening also extends about three inches under the filter, thus making the opening about six inches deep. The secondary hopper opening extends the full width of the filters 40 which is about two feet. The secondary hopper outlet conduit 50 is connected to chamber outlet 52 and is used for constant recirculation of the paint powder in the apparatus.

Figure 16:
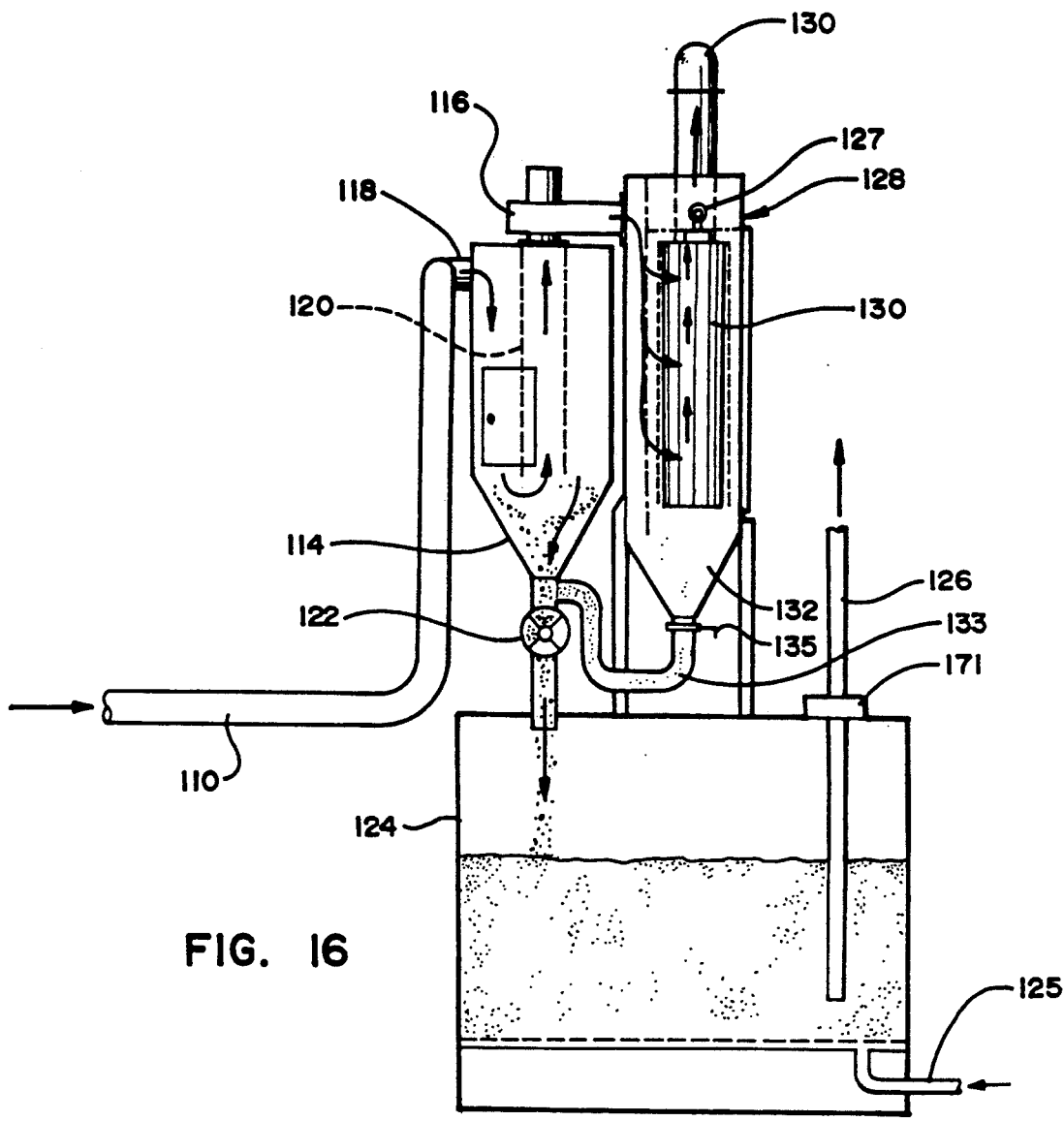
FIG. 16 is a rear elevational view of the paint recycling apparatus of the present invention.
Figure 17:
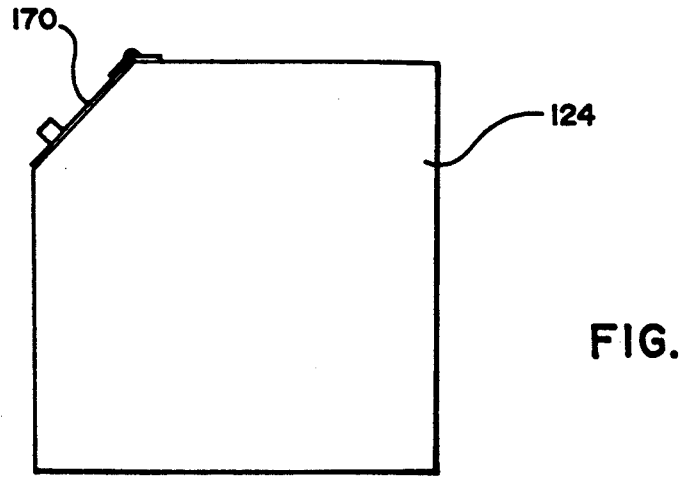
FIG. 17 is a side elevational view of the paint bin shown in FIG. 16.

As shown in FIGS. 1 and 2, a flexible outlet conduit 110 for each color (only one is shown) is connected to outlet 52 and leads to paint recycle apparatus 112 for each color. These conduits also can be suspended above the work area to keep them out of the way. The paint recycle apparatus, as shown in FIGS. 16 and 17, consists of a cyclone 114 through which air is drawn by fan 116 mounted on the outlet of the cyclone. Air and entrained powdered paint are drawn from the paint hoppers into an inlet 118 in the upper end of the cyclone, and the air passes downwardly and then upwardly through the central core 120 of the cyclone, in a conventional manner. Particles entrained in the air fall downwardly as the air turns upwardly, and these particles are deposited in the lower end of the cyclone. The particles then pass through a rotary air lock 122 and are deposited in a fluidized bed storage bin 124 located below the outlet of the cyclone. A fluidizing air supply is introduced into the underside of the bed through inlet pipe 125. This keeps the paint in suspension on a fluidized bed and makes it easier to dispense. A door 170 on the bin is opened to add more paint. This paint is withdrawn by a pump 171 through outlet tube 126 and is directed to the painting apparatus for reuse in the paint gun. Air and any remaining entrained paint particles passing through the cyclone are directed by the fan to a secondary filter 128. The air passes through a pleated filter cartridge 130 in the filter and then is conveyed outwardly to the inlet of the return air plenum chamber 94 through conduit 130. Periodically the filter elements 130 are subjected to an air back flow by an internal pulse jet mechanism 127 to dislodge the paint particles and cause them to fall to the bottom of chamber 132. These particles typically are smaller paint particles or "fines" and are reconveyed through conduit 133 to the outlet of cyclone 114 upstream of rotary airlock 122. A valve 135 can be used to stop the recycling. Thus, these particles are refiltered until they finally are deposited into bin 124.

The operation of the secondary paint hopper is an important feature of the present invention. Fan 116 continuously draws air through the opening of the secondary storage hopper and directs the air through cyclone 114 and filter 128 and reintroduces the air into the room through the filters 95 on the front face of the return air plenum chamber. Thus, the paint recirculation apparatus continues to provide the same forward flow of air from the back of the operator toward the paint recovery booth. The air flow through the secondary paint recovery hopper, however, has a downward direction as the air approaches filters 40. This causes a downward direction of air flow across the filters as the air approaches the filters. Paint particles entrained in the air flowing toward the paint recovery chamber thus settle under gravity as they approach the filters 40, with the heavier particles being deposited directly in the primary paint hopper. Other particles are carried downwardly by the downward direction of air flow and fall into the secondary paint hopper adjacent the front face of the filters. The air flow is significant enough that a good portion of the paint particles that would otherwise be deposited on the filter are instead conveyed directly to the return hopper and returned directly for reuse in the paint apparatus. This slows the rate at which the paint particles fill and clog the filters 40. When the filters 40 are clogged, a electrical motor operating an eccentric striking mechanism 41 (FIG. 1) hits the filters and vibrates them so that the paint is dislodged from the filters and falls into the secondary or primary filter. The filters are mounted in a neoprene mounting so that they can vibrate in response to the filter vibrating mechanism. The secondary paint hopper and the automatic recirculation of paint through the paint recycling apparatus substantially improves the efficiency and the longevity of the filters.

When the primary hopper accumulates a substantial amount of powdered paint, gate valve 54 is manually opened and the suction created by blower 116 sucks the paint out the outlet and into return pipe 110, thus automatically emptying the primary hopper as well as the secondary hopper.

As shown in FIG. 1, there is a separate paint recycling apparatus 112 that corresponds with each color of paint for each of the paint chambers in the paint recovery booth. These are all identical but each is dedicated to a single color of paint. There is a separate return hose 110 for each of the paint recovery apparatus. When colors are to be changed, the hose 110 is disconnected from the existing paint chamber, the recovery booth is rotated until the appropriate paint chamber is facing the painting station, and the hose 110 for the appropriate color is connected to the outlet of that chamber. Thus, it is not necessary to clean any of the hoses but merely to connect a new hose to the appropriate chamber.

The hoses for the paint gun 14 are connected and disconnected in the same manner. A separate hose 136 can be provided for each color, with the hose drawing paint from the fluidizing bed reservoir in the appropriate paint bin 124 through outlet conduit 126. When a paint color is changed, the hose can be disconnected from the paint gun and the hose for the new color can be connected to the paint gun.

Figure 12:
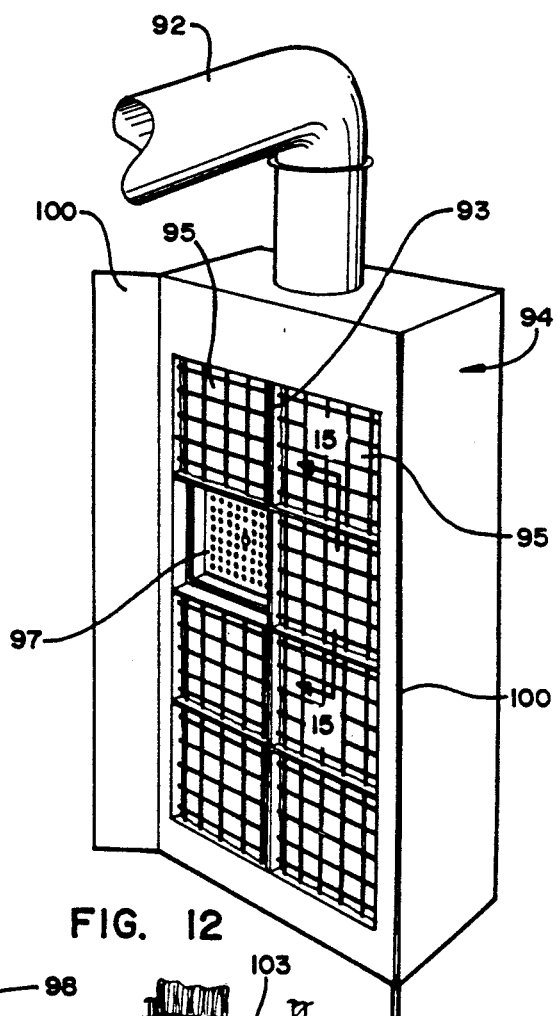
FIG. 12 is a perspective view of the return air outlet plenum chamber of the present invention.
Figure 14:
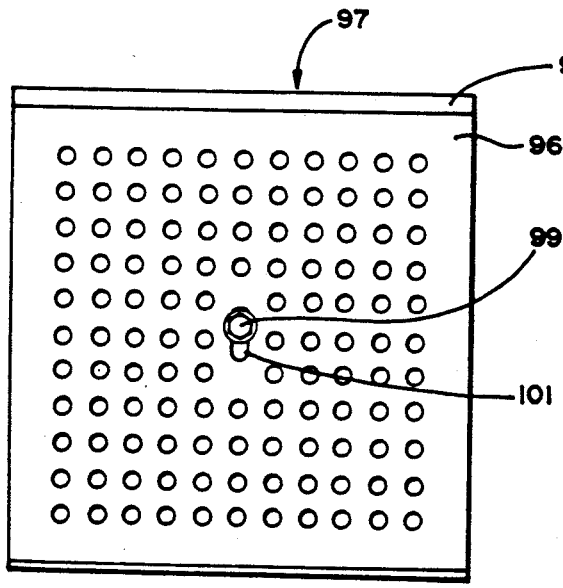
FIG. 14 is a front elevational view of the air flow control mechanism of FIG. 13.
Figure 15:
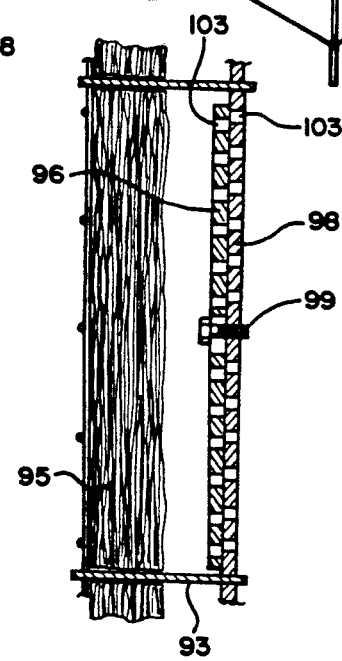
FIG. 15 is a sectional view taken along lines 15—15 of FIG. 12.

The paint recovery booth of the present invention can be manufactured in any desired size for a particular work area. Two sizes are convenient. FIG. 1 shows a paint booth that is six feet in diameter. The air return plenum chamber for this paint booth is shown in FIG. 12, the plenum chamber being approximately as wide as the paint booth, including flanges 100. The plenum chamber has a front surface grid work that is adapted to accommodate two side by side columns of four filters. A wider paint booth 140 is shown in FIG. 18. This paint booth is approximately 12 feet in diameter. This paint booth 140 is substantially the same as the paint booth described above, except that it is twice as big.

Figure 4:
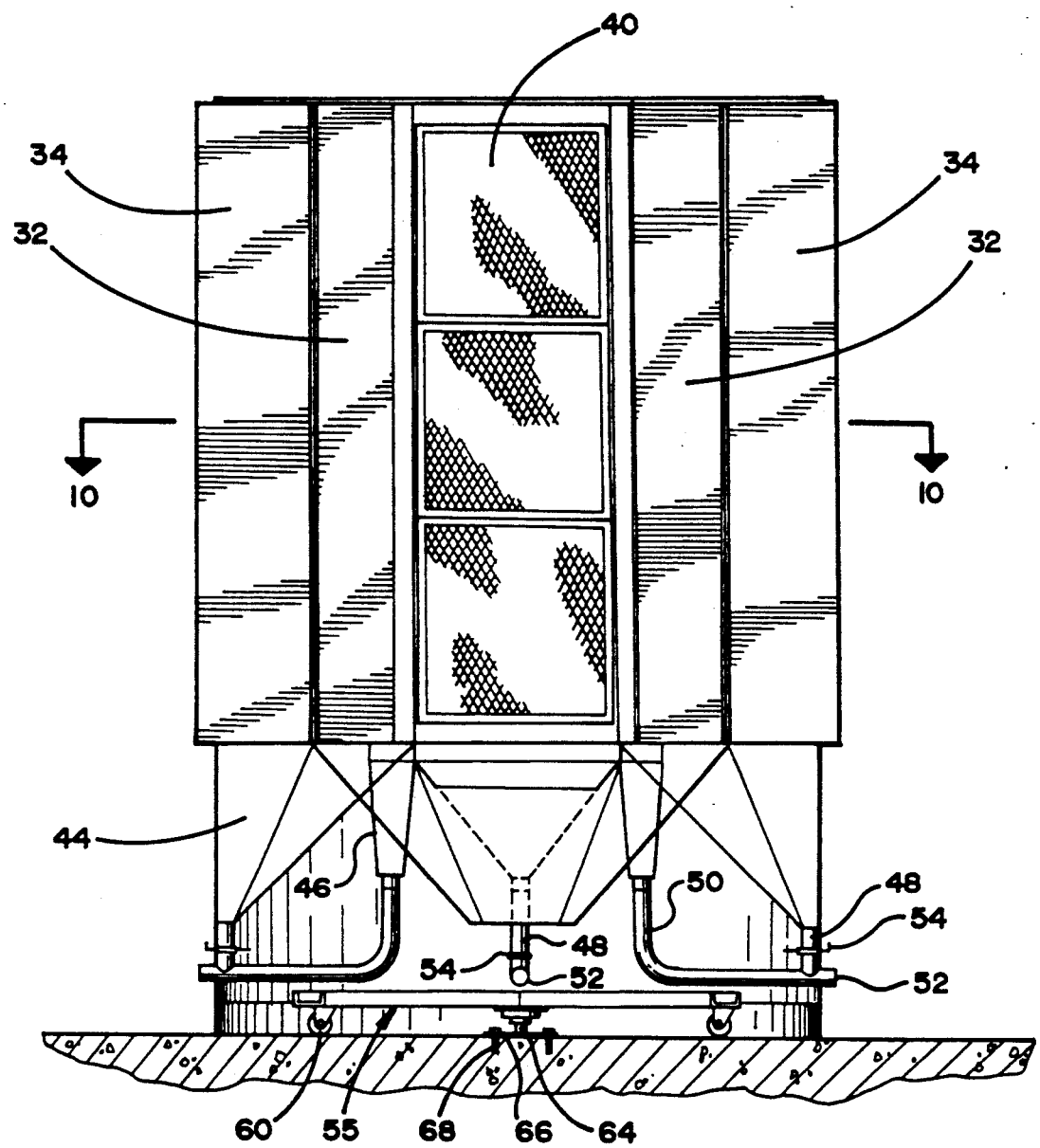
FIG. 4 is a side elevational view of the paint recovery booth of the present invention.
Figure 5:
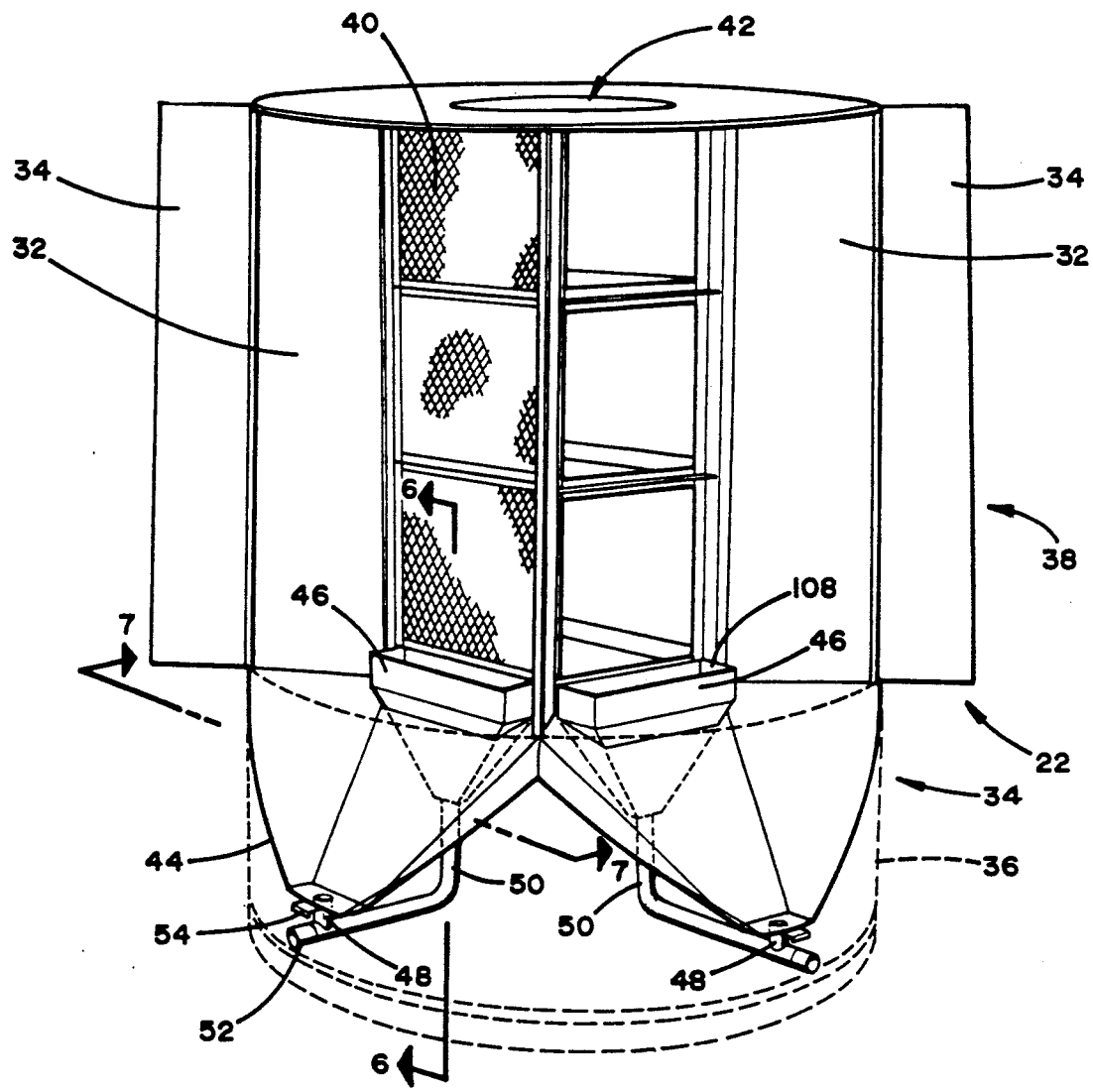
FIG. 5 is a perspective view of the paint recovery booth of the present invention.
Figure 6:
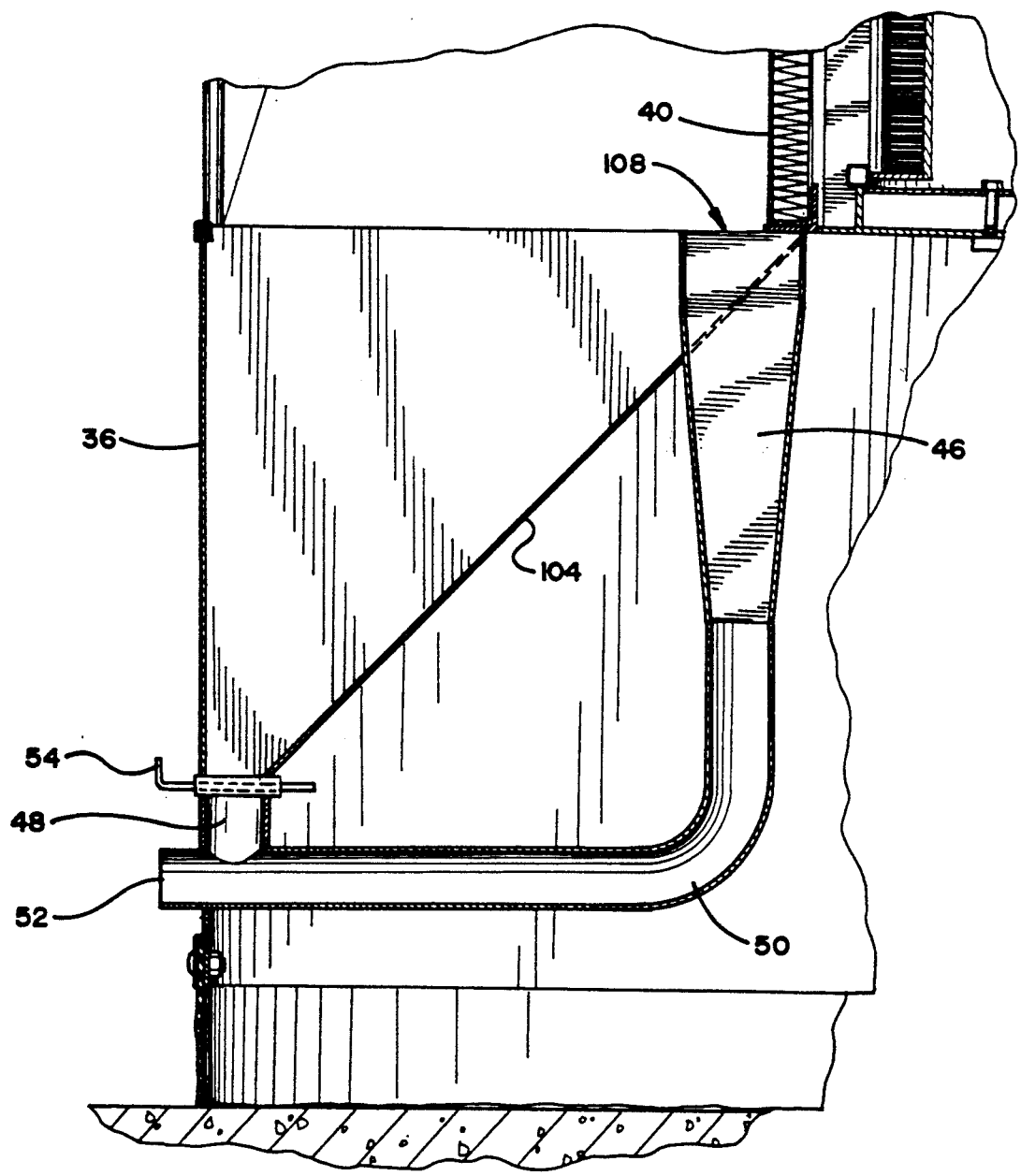
FIG. 6 is a fragmentary side elevational sectional view of the paint hoppers of the present invention.
Figure 7:
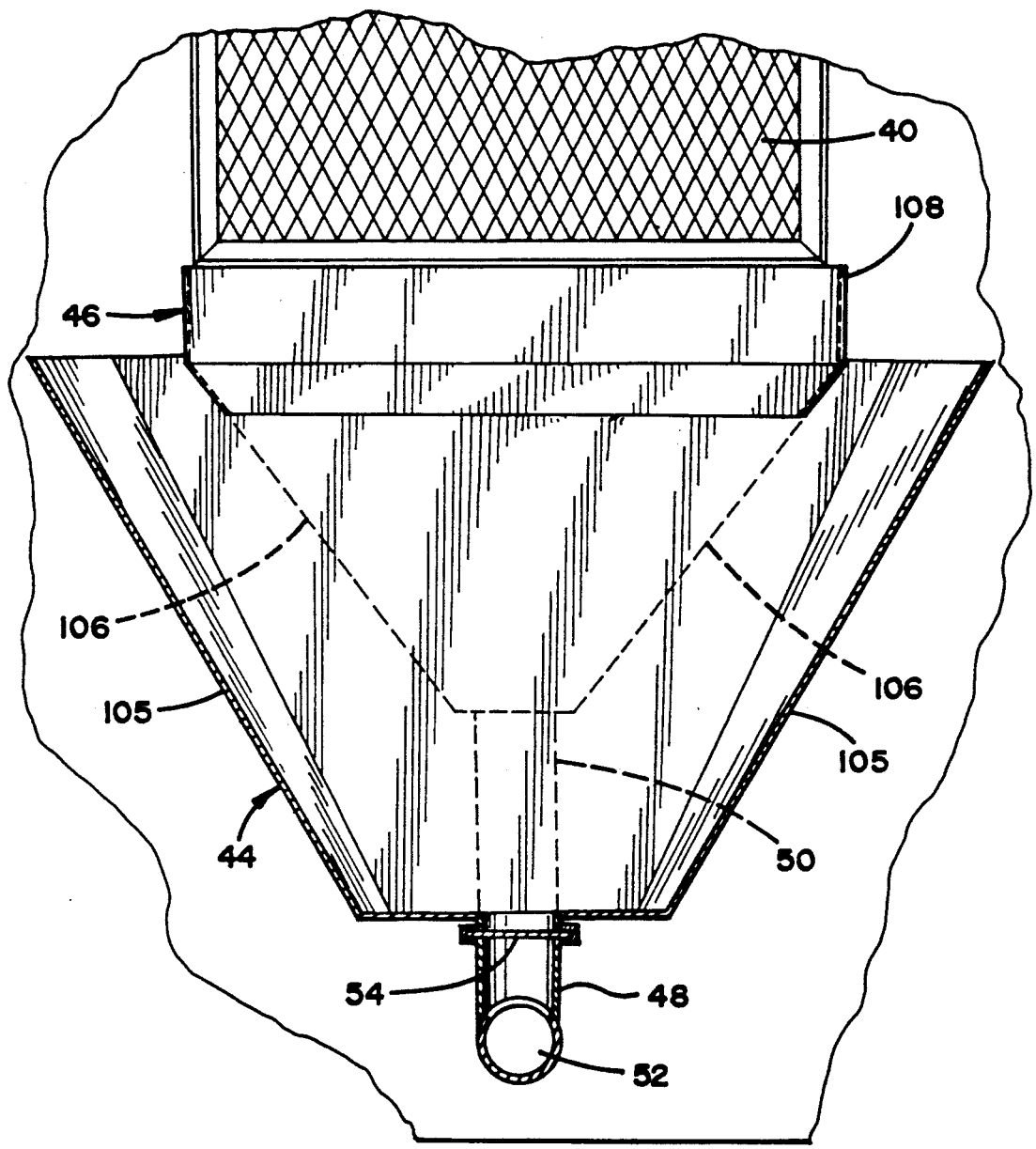
FIG. 7 is a fragmentary front elevational view of the paint hoppers of the present invention.

An alternative feature of the present invention is shown in connection with this paint booth, and that is a side exiting exhaust pipe 142. Whereas the embodiments shown in FIGS. 4-6 comprise an exhaust pipe that exits at an outlet opening 52 in the center of each paint chamber, exhaust pipe 142 extends to the side of each chamber and then exits at an outlet opening 144 at the extreme side of each chamber. Exhaust pipe 142 has a side pipe 146 connected to the outlet of the secondary hopper and a side pipe 148 connected to the outlet of the primary hopper. There is no manual outlet valve in pipe 148 in this example, so that primary hopper 148 will be continuously emptied through this outlet exhaust pipe. A valve could be used as in the other pipe outlet. Exhaust pipe 142 also includes additional side pipes 150 and 152. These extend upwardly at the ends of each filter so as to catch the powder paint particles that fall to the side of the secondary hopper. The principal purpose of exhaust pipe 142 is to place the outlet 144 at the side of the paint recovery chamber so that the return pipes can be positioned out of the way of the painting station and the operator.

When a larger paint booth is used, a larger air return plenum chamber 154 is used, as shown on FIG. 18. This chamber is about 12 feet wide or slightly wider and includes inclined ends 156, with seven columns of filters being shown in this chamber. The same paint recycling apparatus is used for the large and small paint booths.

In the operation of the paint recovery apparatus of the present invention, an operator discharges powdered paint toward an object 16a at the painting station. The charged paint particles adhere to the surface of the part and those that do not adhere to the surface of the part (including smaller fines that do not hold a charge) drift toward the paint recovery booth and pass over the primary and secondary paint hoppers. There, under the influence of gravity and the downward flow of air, a good portion of the paint particles are deposited in the paint hoppers. The remaining air passes through filters 40, which desirably are high efficiency filters that filter out all paint particles. The air is then passed upwardly through air return duct 92 to the return air plenum chamber and then is returned to the room, enhancing the passage air flow toward the paint recovery booth. Paint in the meantime is recycled through the primary and secondary paint hoppers and returned to the fluidized paint storage bin for that particular color, where it is recycled through the paint application apparatus. Vibrator 41 is actuated periodically to dislodge powdered paint from the surface of filters 40 so as to unclog the filters. The paint is then recycled through the primary and secondary hoppers.

Figure 11:
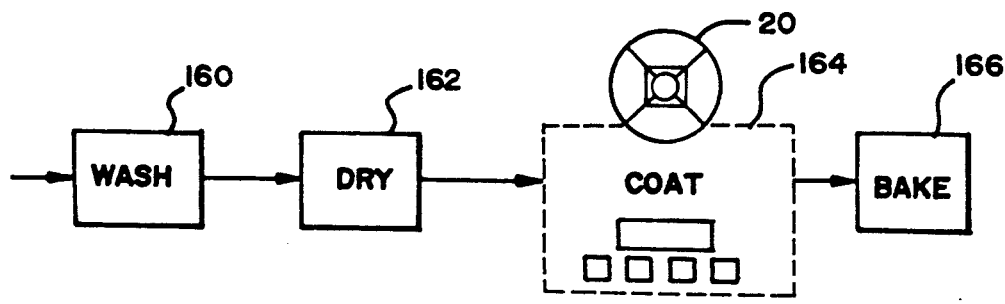
FIG. 11 is a schematic diagram of a powder coat paint operation employing the paint recovery apparatus of the present invention.
Figure 13:
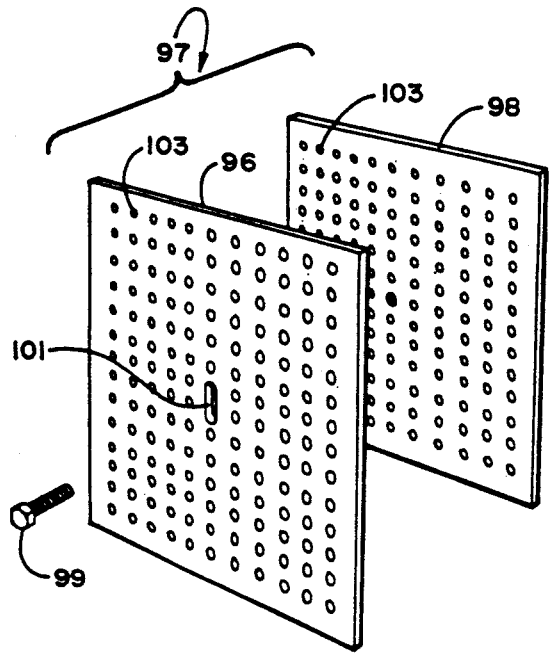
FIG. 13 is an exploded view of a diffuser plate airflow control mechanism employed in the return air plenum chamber of the present invention.

The process of the present invention also includes some important improvements over prior processes. In the present powder coat painting operation, as shown in FIG. 11, the parts are first washed at a washing station 160 and then dried in a drying station 162 (at 240° F. for five minutes). The powder coat is then applied at a painting station 164 and the part is then baked in an oven 166 until the paint is fused on the surface of the part. In a conventional paint process, the parts are not preheated prior to the application of the powder coat paint, and it seems to be against conventional wisdom to do so. In the present process, however, parts are heated to a temperature of between 120° and approximately 150° F. before they are painted. Preferably, the parts are heated to a temperature range of 120°-140° F. To achieve this the painting station is positioned about 100 to 140 feet away from the drying station. The parts, heated by the drying process, are conveyed at a rate through this distance that leaves the parts heated to 120°-150° F. and preferably 120°-140° F. when they are painted. When the parts are heated in this manner, there is a substantially greater adherence of the powder coat paint particles to the parts, particularly the fines or small particles that ordinarily will not hold a charge and will not adhere to a part. Fines constitute a substantial portion of powder coat paint and heretofore the fines have been unusable in the process. With the present process, fines adhere readily to the surface of the products, even though they do not hold a charge, and the fines that are not attracted to the product are continuously recycled until they are reused. The process of the present invention has a much higher rate of fine use than prior processes. With most of the fines being recovered in the secondary filter of the paint recycling apparatus, which is a pleated filter, the fines are then recycled along with the larger particles returned from the primary and secondary paint bins so that they are thoroughly mixed with the other paint particles. It is desirable to have the fines intermixed with the larger particles in this manner, rather than depositing the fines directly into the paint bin.

It should be understood that the foregoing process and apparatus are merely exemplary of the preferred practice of the present invention and that various changes and modifications may be made in the arrangements and details of construction of the embodiments disclosed herein without departing from the spirit and scope of the present invention, which is defined in the appended claims.

I claim:

1. Multi-color powder coat paint recovery apparatus for recovering excess powdered paint particles not deposited on an article being painted by a paint applicator at a painting station, comprising:

a paint recovery booth positionable adjacent the painting station on a side opposite the paint applicator, the paint recovery booth including a housing mounted for rotation about a vertical axis and having a plurality of individual paint color recovery chambers angularly spaced around the periphery of the housing, each chamber having an open outer side and filter means at an inner side, with the inner side being in communication with an air exhaust outlet from the interior of the housing, each chamber further having a paint hopper positioned below the filter means and extending outwardly toward the outer side of the chamber, air circulation means being connected to the air outlet for drawing air inwardly through the open outer side of the chamber, through the filter means, and then out of the housing through the air outlet, the housing being rotatable such that a color chamber corresponding to the paint color being applied can be rotated to a position opposite the painting station, the air circulation means creating an air flow from the paint applicator over the part being painted and through the open outer side of the chamber, over the paint hopper, through the filter means and then out the outlet, excess paint particles entrained in the air falling toward the bin under the influence of gravity, with some particles falling into the hopper, the remaining particles being separated from the air by the filter means, with clean air being discharged from the outlet.

2. Paint recovery apparatus according to claim 1 and further comprising means for conveying the exhausted air to a filtered return air plenum chamber positioned behind the paint applicator, such that the air is recirculated from the return air plenum chamber through the painting station and the paint recovery chamber and then back to the return air plenum chamber for reuse in the system, with the apparatus creating an air flow directed toward the paint recovery booth.

3. Paint recovery apparatus according to claim 1 and further comprising paint recycling means for conveying the powdered paint deposited in the paint hopper back to the paint applicator for reuse in the apparatus, the paint recycling means causing a downdraft across a front face of the filter means such that paint particles about to be deposited on the filter means are urged by the downward air flow to be conveyed downwardly to the paint hopper without being deposited on the filter means, thus enhancing the recirculation of powdered paint and slowing the rate at which the filters become loaded with paint.

4. Paint recovery apparatus according to claim 3 wherein the paint hopper includes a primary hopper that extends to the outer edge of the paint booth and a relatively narrow secondary hopper positioned below the filter means and extending outwardly therefrom a short distance past the filter means, the secondary hopper having an outlet at a lower portion thereof, the paint recycling means being connected to the outlet and drawing air and paint particles downwardly through the secondary hopper and conveying them to separation means for separating the paint particles from the air and storing the paint particles for reuse, the paint recycling means causing an enhanced downward air draft over the filter means surface that draws a significant portion of the excess paint particles downwardly into the secondary hopper without being deposited on the filter means.

5. Paint recovery apparatus according to claim 4 wherein the primary hopper includes a selectably openable valve outlet at a lower portion thereof which is in communication with the outlet of the secondary hopper, such that when said valve is open the particles collecting in the primary hopper are drawn out of the primary hopper and recycled for reuse along with the paint particles recycled from the secondary hopper.

6. Paint recovery apparatus according to claim 5 wherein each paint chamber includes its own hopper outlet for recycling collected paint, the apparatus including separate paint separation means for each color and having hosing means for interconnecting each separation means with the outlet of the paint chamber corresponding to the same color.

* * * * *